(12) United States Patent
Chang et al.

(10) Patent No.: US 7,759,006 B2
(45) Date of Patent: Jul. 20, 2010

(54) ELECTRODE ACTIVE MATERIAL FOR LITHIUM SECONDARY BATTERY

(75) Inventors: Sung Kyun Chang, Daejeon (KR); Jeong Ju Cho, Daejeon (KR)

(73) Assignee: LG Chem, Ltd. (KR)

( * ) Notice: Subject to any disclaimer, the term of this patent is extended or adjusted under 35 U.S.C. 154(b) by 528 days.

(21) Appl. No.: 11/181,045

(22) Filed: Jul. 14, 2005

(65) Prior Publication Data

US 2006/0014079 A1    Jan. 19, 2006

(30) Foreign Application Priority Data

Jul. 16, 2004    (KR) .................... 10-2004-0055562

(51) Int. Cl.
*H01M 4/58* (2010.01)
(52) U.S. Cl. .............. 429/231.1; 429/231.2; 429/231.3; 429/231.5; 429/218.1; 429/220; 429/221; 429/223; 429/224; 429/225; 423/306; 423/299; 423/304; 423/312; 423/593.1; 423/594.2; 423/598; 423/599; 423/600; 423/594.8; 423/594.9; 423/594.12; 423/594.15
(58) Field of Classification Search .............. 429/231.1, 429/220, 221, 223, 224, 225, 231.2, 231.3, 429/231.5, 218.1; 423/306, 299, 304, 312, 423/322, 579, 592.1, 593.1, 594.2, 594.4, 423/594.6, 598, 599, 600, 594.8, 594.9, 594.12, 423/594.14, 594.15
See application file for complete search history.

(56) References Cited

U.S. PATENT DOCUMENTS 6,514,640 B1    2/2003    Armand et al.

6,984,470 B2 *    1/2006    Morishima et al. ..... 429/231.95
2003/0054253 A1    3/2003    Morishima et al.

FOREIGN PATENT DOCUMENTS

| EP | 1 246 290 | * | 10/2002 |
| JP | 09-134725 | * | 5/1997 |
| JP | 2002-117903 |   | 4/2002 |
| JP | 2003-187799 |   | 7/2003 |
| JP | 2003-203628 |   | 7/2003 |
| JP | 2003-217584 |   | 7/2003 |
| JP | 2004-178835 | * | 6/2004 |
| JP | 2005-63825 | * | 3/2005 |

OTHER PUBLICATIONS

PCT International Search Report, PCT International Appl. No. PCT/KR2005/002123, Date of Mailing: Sep. 28, 2005.
Chinese Office Action dated May 21, 2008; In reference to Chinese Patent Application No. 200580023987.8 (PCT/KR2005/002123) (English Translation provided).
"Electronically conductive phospho-olivines as lithium storage electrodes"; Authors: Chung, et al.; Nature Materials, 1, 123-128 (2002).
"Lithium-ion batteries: An unexpected conductor"; Author: Michael Thackeray; Nature Materials 1, 81-82 (2002).

* cited by examiner

*Primary Examiner*—Laura S Weiner
(74) *Attorney, Agent, or Firm*—Cantor Colburn LLP

(57) ABSTRACT

Disclosed is a compound represented by the following formula 1. A lithium secondary battery using the same compound as electrode active material, preferably as cathode active material, is also disclosed.

$$LiMP_{1-x}A_xO_4 \qquad \text{[Formula 1]}$$

wherein M is a transition metal, A is an element having an oxidation number of +4 or less and $0<x<1$. The electrode active material comprising a compound represented by the formula of $LiMP_{1-x}A_xO_4$ shows excellent conductivity and charge/discharge capacity compared to $LiMPO_4$.

6 Claims, 2 Drawing Sheets

ELECTRODE ACTIVE MATERIAL FOR LITHIUM SECONDARY BATTERY

TECHNICAL FIELD

The present invention relates to a novel electrode active material that can be used in a lithium secondary battery and has improved conductivity.

BACKGROUND ART

Due to the structural stability of $LiMPO_4$ resulting from covalent bonds therein, many attempts are made to develop $LiMPO_4$ as advanced cathode active material for a lithium secondary battery. However, because $LiMPO_4$ has very low conductivity, conductivity of $LiMPO_4$ should be improved in order to commonly use it as electrode active material. Therefore, research and development are made intensively to improve the conductivity of $LiMPO_4$.

Typically, two types of methods are used to improve the conductivity of $LiMPO_4$. One method that is used generally includes a step of adding carbon during a mixing step preceding heat treatment in preparing $LiMPO_4$. By doing so, carbon is coated on surfaces of active material particles formed of $LiMPO_4$ to provide $LiMPO_4$ having improved conductivity. Another method that is used recently includes substituting Li or M sites of $LiMPO_4$ with a metal having a different oxidation number. JP 2002-117903 discloses an electrode active material comprising a compound represented by the formula of $Li_xFe_{1-y}M_yPO_4$, wherein M is Mn, Cr, Co, Cu, Ni, V, Mo, Ti, Zn, Al, Ga, Mg, B or Nb; x is a number of between 0.05 and 1.2; and y is a number of between 0 and 0.8.

DISCLOSURE OF THE INVENTION

Therefore, the present invention has been made in order to improve low conductivity of $LiMPO_4$. It is an object of the present invention to provide a novel electrode active material comprising $LiMPO_4$ in which P atoms in the polyanionic $PO_4^{3-}$ sites are partially substituted with a different element instead of substituting Li or M sites with a different element.

According to an aspect of the present invention, there is provided a compound represented by the following formula 1. There is also provided a lithium secondary battery using the same compound as electrode active material, preferably as cathode active material.

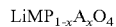 [Formula 1]

wherein M is a transition metal, A is an element having an oxidation number of +4 or less and 0<x<1.

Preferably, in the above formula 1, M is at least one transition metal selected from the group consisting of Fe, Co, Mn, Ni, V, Cu and Ti.

Hereinafter, the present invention will be explained in more detail.

It is reported by MIT Yet-Ming Chiang et al. that when a transition metal is converted into its multi-valent oxidized state, its conductivity increases significantly compared to its single-valent state (Nature materials 1, 123-128 (2002)/nature materials 1, 81-82).

The present invention is based on the fact that conversion of a transition metal M in $LiMPO_4$ into a multivalent oxidized state results in a significant increase in conductivity compared to its single-valent state.

According to the present invention, in order to improve low conductivity of $LiMPO_4$ (wherein M is a transition metal with a valency of +2), P atoms (with an oxidation number of +5) of the polyanionic $PO_4^{3-}$ sites in $LiMPO_4$ are partially substituted with a different element (A) with a oxidation number of +4 or less, thereby providing a novel compound in which the transition metal M has a total oxidation number of between +2 and +3.

In order to convert the transition metal (M) of $LiMPO_4$ into a multivalent state, P should be substituted with a different element with an oxidation number other than +5. When P is substituted with an element (A) with an oxidation number of +4, the total average oxidation number of M is more than +2. In other words, the present invention is characterized in that the polyanionic $PO_4^{3-}$ has a different element (A) that causes the transition metal (M) to have an oxidation number of between +2 and +3 (i.e., +3>M>+2). By doing so, it can be expected that the novel compound according to the present invention has improved conductivity in a similar manner to the prior art.

Such conversion of the transition metal M of $LiMPO_4$ into a multivalent state may be exemplified as follows.

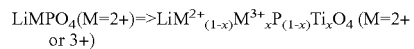

wherein M is at least one transition metal selected from the group consisting of Fe, Co, Mn, Ni, V, Cu, Ti, etc., and 0<X<1.

Additionally, according to the prior art, substitution of Li and transition metal sites with other elements having a different oxidation number is followed by a drop in amount of Li and a structural change including generation of oxygen defects so as to balance the total oxidation valence. However, substitution in the polyanion according to the present invention results in improvement of conductivity without any structural changes.

Non-limiting examples of the element with an oxidation number $\leq +4$ and capable of substituting P include $Ti^{4+}$, $Al^{3+}$, $B^{3+}$, $Zr^{4+}$, $Sn^{4+}$, $V^{4+}$, $Pb^{4+}$, $Ge^{4+}$, etc.

In order to synthesize the compound represented by the above formula 1, precursor of the transition metal (M) and precursor of the metal (A) for substitution (for example, lithium metal oxides, hydroxides, nitrates, oxides, carbonates, acetates, oxalates, sulfates or chlorides of the transition metal or the metal for substitution), lithium precursor (for example, lithium nitrate, lithium acetate, lithium hydroxide, lithium carbonate, lithium oxide, lithium sulfate or lithium chloride) and precursor of $PO_4$ (for example, ammonium dihydrogen phosphate) are mixed in a desired equivalent ratio.

In this mixing step, a mortar grinder mixing technique is used to form a mixture containing precursor of the transition metal (M), lithium precursor, precursor of $PO_4$ and precursor of the metal (A) for substitution in a desired equivalent ratio. To accomplish this, a dry mixing process or wet mixing process may be used. A dry mixing process is performed with no solvent, while a wet mixing process is performed by adding a suitable solvent such as ethanol, methanol, water, acetone, etc., and mixing to a solvent-free state. Before heat treating the mixture formed as described above, the mixture is preferably palletized. However, such palletizing may be omitted.

The mixture formed as described above is heat treated at a temperature of between 350 and 550° C. for 1-12 hours and then further heat treated at a temperature of between 700 and 950° C. for 4-24 hours to provide crystalline powder of the compound represented by the above formula 1. The heat treating process is performed under the atmosphere of dry air, nitrogen or oxygen at a heating/cooling rate of 0.5-10°

C./min. The mixture is maintained in each heat treating temperature for a predetermined time as described above.

Then, the powder of the compound represented by formula 1 is pulverized by mortar grinding.

An electrode for a battery is manufactured by using the compound of formula 1 obtained as described above as electrode active material. To manufacture an electrode, a conductive agent for imparting electroconductivity and a binder for making adhesion between an electrode active material and a collector are necessary in addition to the electrode active material. 1-30 wt % of a conductive agent and 1-20 wt % of a binder are mixed with an electrode active material based on the weight of the electrode active material to form a mixture, and then a dispersing agent is added thereto with stirring to provide paste. Finally, the paste is applied to a collector made of metal, followed by compressing and drying, to provide a laminate-shaped electrode.

In general, carbon black is used as the conductive agent. Particular examples of commercially available conductive agents include acetylene black (available from Chevron Chemical Company or Gulf Oil Company), Ketjen Black EC series (available from Armak Company), Vulcan XC-72 (available from Cabot Company) and Super P (3M Co.).

Typical examples of the binder include polytetrafluoroethylene (PTFE), polyvinylidene fluoride (PVdF) or copolymers thereof, cellulose, etc. Typical examples of the dispersing agent include isopropyl alcohol, N-methylpyrrolidone (NMP), acetone, etc.

The metal forming the collector is a metal with high conductivity. There is no particular limitation in selection of the metal, as long as the metal has no reactivity in the range of drive voltage of the battery and permits the electrode active material paste to be adhered with ease. Typical examples of the metal collector include mesh or foil made of aluminum or stainless steel.

The method of applying the electrode active material paste onto the metal collector can be selected among known methods depending on characteristics of particular materials. Otherwise, the method can be suitably designed. For example, the paste is distributed onto the collector and then dispersed thereon uniformly by using a doctor blade, etc. If necessary, the distribution step and dispersion step may be carried out in one step. In addition to the above method, other methods such as die casting, comma coating or screen printing may be used. Otherwise, the paste may be formed on a separate substrate and then is bonded with a collector by a pressing or lamination process.

The paste applied on the collector as described above may be dried, for example, in a vacuum oven at a temperature of between 50 and 200° C. for 1 to 3 days.

A method for manufacturing a lithium secondary battery by using the electrode obtained as described above may be exemplified as follows. The electrode is used as cathode. As anode active materials, used are carbonaceous materials such as hard carbon or graphitized carbon; metal composite oxides such as $Li_xFe_2O_3$ ($0 \leq x \leq 1$), $Li_xWO_2$ ($0 \leq x \leq 1$) or $Sn_xMe_{1-x}Me'_yO_z$ (Me: Mn, Fe, Pb, Ge; Me': Al, B, P, Si, Group 1, 2 or 3 element in the Periodic Table, halogen; $0<x\leq1$; $1\leq y\leq3$; $1\leq z\leq8$); lithium metal; lithium alloys; silicon-containing alloys; tin-containing alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ or $Bi_2O_5$; conductive polymers such as polyacetylene; Li—Co—Ni based materials, or the like. A separator is interposed between the cathode and anode. The separator serves to interrupt internal short circuit between both electrodes and to receive an electrolyte infiltrated therein. Typical examples of the separator that may be used include polymers, glass fiber mats, kraft paper, etc. Commercially available separators include the Celgard series available from Hoechest Celanese Corp. (for example, Celgard 2400 and 2300)* and polypropylene membranes available from Ube Industries Ltd. or Pall RAI Co.

The electrolyte is a system comprising a lithium salt dissolved in an organic solvent. Particular examples of the lithium salt that may be used include $LiClO_4$, $LiCF_3SO_3$, $LiAsF_6$, $LiBF_4$, $LiN(CF_3SO_2)_2$, $LiPF_6$, LiSCN and $LiC(CF_3SO_2)_3$. Particular examples of the organic solvent that may be used include ethylene Carbonate (EC), propylene carbonate (PC), diethylcarbonate (DEC), dimethylcarbonate (DMC), 1,2-dimethoxyethane, 1,2-diethoxyethane, gamma-butyrolactone, tetrahydrofuran, 2-methyltetrahydrofuran, 1,3-dioxolane, 4-methyl-1,3-dioxolane, diethylether and sulfolane. Such organic solvents may be used alone or in combination.

BEST MODE FOR CARRYING OUT THE INVENTION

Reference will now be made in detail to the preferred embodiments of the present invention. It is to be understood that the following examples are illustrative only and the present invention is not limited thereto.

Comparative Example 1

Synthesis of $LiCoPO_4$

Co-acetate, Li-carbonate and ammonium dihydrogen phosphate were introduced into a mortar mixer in a desired equivalent ratio and then mixed to obtain a mixture. The resultant powder was introduced into an electric furnace under nitrogen atmosphere and reacted at 300° C. for 12 hours to remove impurities. The powder free from impurities was mixed again in a mortar mixer. Then, the mixed powder was introduced into an electric furnace under nitrogen atmosphere and reacted at 700° C. for 24 hours to obtain a final product ($LiCoPO_4$).

<Manufacture of Battery>

The final product, $LiCoPO_4$ was used as cathode active material. Slurry was formed by mixing the cathode active material, a conductive agent and binder in the ratio of 90:5:5 and the resultant slurry was applied onto Al foil to provide an electrode. As counter electrode, lithium metal was used. An electrolyte containing EC:EMC (1:2) in which 1M $LiPF_6$ was dissolved was used along with the cathode and anode to provide a coin type battery.

Example 1

Synthesis of LiCoP$_{0.98}$Ti$_{0.02}$O$_4$ and Manufacture of Battery

Comparative Example 1 was repeated to obtain a final product (LiCoP$_{0.98}$Ti$_{0.02}$O$_4$), except that Co-acetate, Li-carbonate, ammonium dihydrogen phosphate and Li$_4$TiO$_4$ were used in a desired equivalent ratio. Additionally, a coin type battery was manufactured in the same manner as Comparative Example 1, except that the final product, LiCoP$_{0.98}$Ti$_{0.02}$O$_4$ was used as cathode active material.

Comparative Example 2

Synthesis of LiFePO$_4$ and Manufacture of Battery

Comparative Example 1 was repeated to obtain a final product (LiFePO$_4$), except that Fe-acetate was used instead of Co-acetate. Additionally, a coin type battery was manufactured in the same manner as Comparative Example 1, except that the final product, LiFePO$_4$ was used as cathode active material.

Example 2

Synthesis of LiFeP$_{0.98}$Ti$_{0.02}$O$_4$ and Manufacture of Battery

Example 1 was repeated to obtain a final product (LiFeP$_{0.98}$Ti$_{0.02}$O$_4$) except that Fe-acetate was used instead of Co-acetate. Additionally, a coin type battery was manufactured in the same manner as Comparative Example 1, except that the final product, LiFeP$_{0.98}$Ti$_{0.02}$O$_4$ was used as cathode active material.

Experimental Example 1

Electrochemical Test

Each of the batteries obtained from Comparative Example 1 and Example 1 was subjected to a charge/discharge cycle in a voltage range of 3-5.2V under constant current (CC) conditions of 0.1 C (15 mAh/g). The results are shown in FIGS. 1 and 2.

Figure 1:
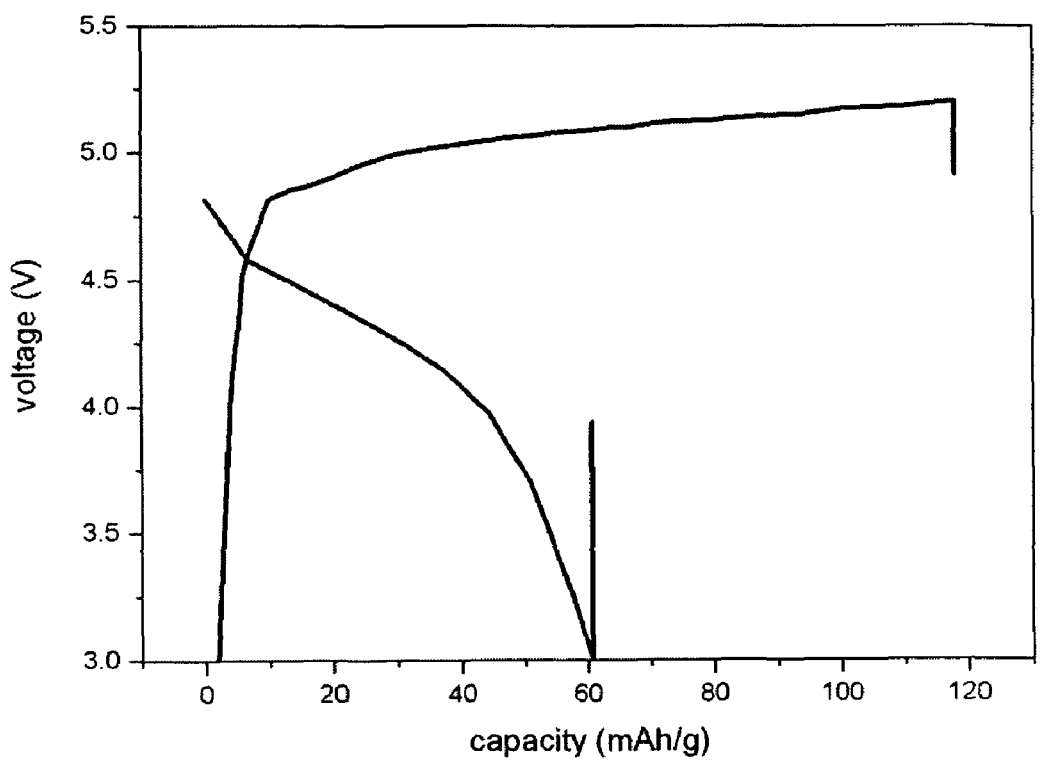
FIG. 1 is a graph showing charge/discharge characteristics of the battery according to Comparative Example 1.
Figure 2:
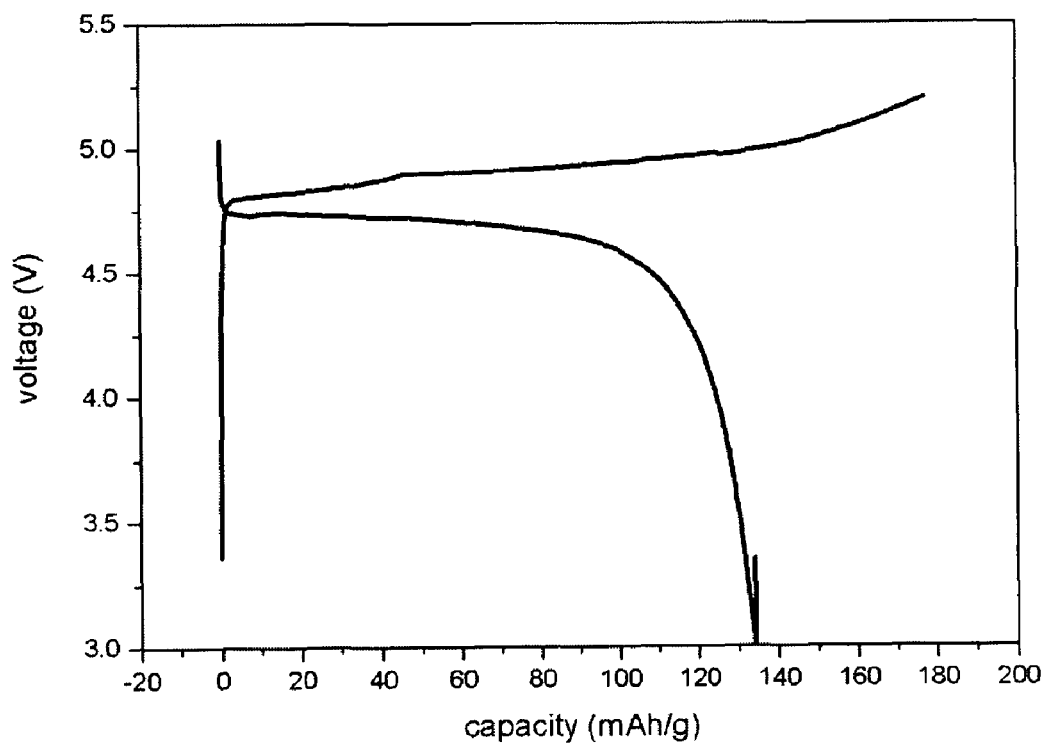
FIG. 2 is a graph showing charge/discharge characteristics of the battery according to Example 1.

As can be seen from FIG. 1 (Comparative Example 1) and FIG. 2 (Example 1), the battery according to Example 1 showed a significant drop in the gap between charge profile and discharge profile, as compared to the battery according to Comparative Example 1. This indicates that the cathode active material according to the present invention shows an increased conductivity and decreased resistance. Further, the battery according to Example 1 showed an increase in charge/discharge capacity. When conductivity of an electrode active material increases, the gap between charge profile and discharge profile of the battery using the same material decreases. This results from a drop in overvoltage appearing in charge/discharge cycles, wherein the overvoltage increases in proportion to the resistance of an electrode active material.

Meanwhile, each of the batteries obtained from Comparative Example 2 and Example 2 was subjected to a charge/discharge cycle in a voltage range of 3-4V under constant current (CC) conditions of 0.1 C. The results are shown in FIGS. 3 and 4.

Figure 3:
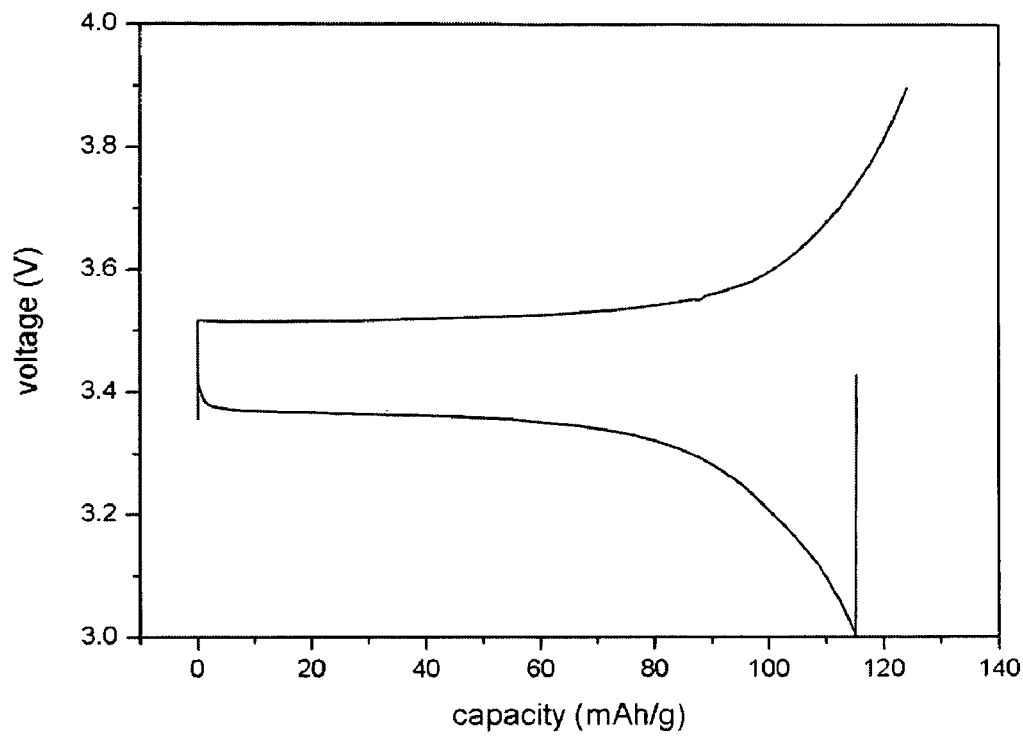
FIG. 3 is a graph showing charge/discharge characteristics of the battery according to Comparative Example 2.
Figure 4:
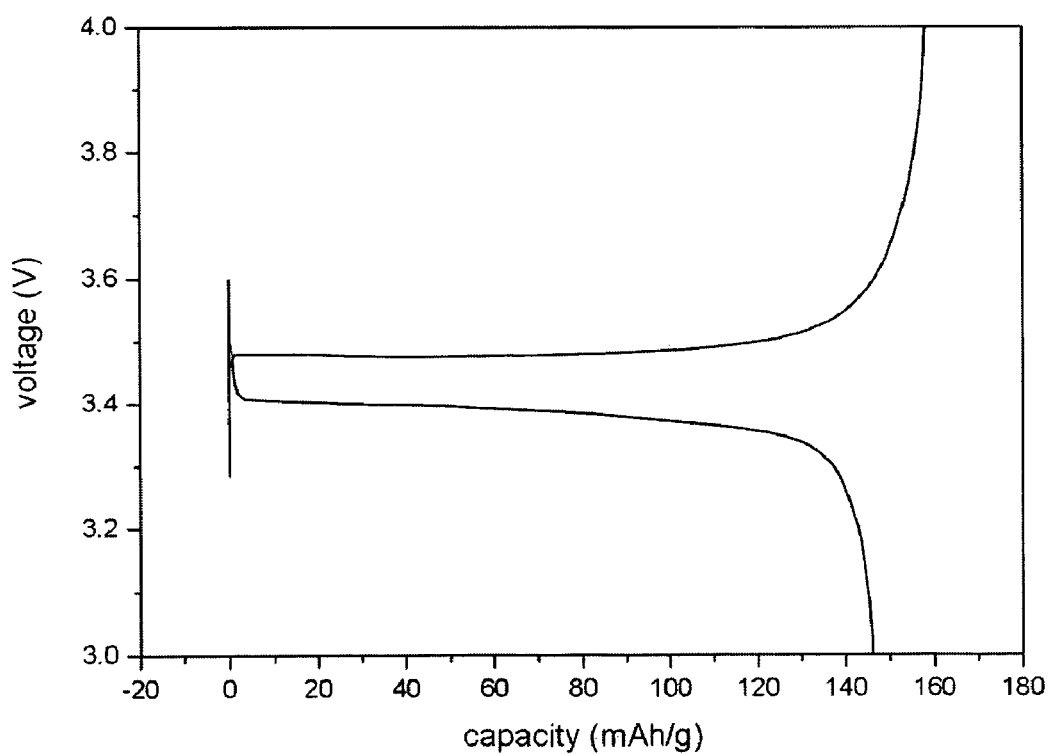
FIG. 4 is a graph showing charge/discharge characteristics of the battery according to Example 2.

Similarly, as can be seen from FIG. 3 (Comparative Example 2) and FIG. 4 (Example 2), the battery according to Example 2 showed a significant drop in the gap between charge profile and discharge profile, as compared to the battery according to Comparative Example 2. This indicates that the cathode active material according to the present invention shows an increased conductivity and decreased resistance. Further, the battery according to Example 2 showed an increase in charge/discharge capacity.

Therefore, it can be seen from FIGS. 2 and 4 that each of the batteries using the cathode active materials according to Examples 1 and 2 operates as a battery and provides excellent battery quality compared to the batteries using the cathode active materials according to Comparative Examples 1 and 2.

INDUSTRIAL APPLICABILITY

As can be seen from the foregoing, the electrode active material comprising LiMP$_{1-x}$A$_x$O$_4$ according to the present invention shows improved conductivity and charge/discharge capacity compared to LiMPO$_4$.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. A compound represented by the following formula 1:

$$\text{LiMP}_{1-x}\text{A}_x\text{O}_4 \qquad \text{[Formula 1]}$$

wherein M is Fe or Mn having an oxidation number of +2 to +3, A is an element having an oxidation number of +3 to +4, wherein A substituting for P is at least one element selected from the group consisting of Ti(4+), Al(3+), B(3+), Zr(4+), Sn(4+), Pb(4+) and Ge(4+), and 0<x<1, at least a fraction of M having a multi-valent oxidized state, resulting in an increase in conductivity compared to its single-valent oxidized state.

2. An electrode active material comprising a compound of the following formula 1 according to claim 1:

$$\text{LiMP}_{1-x}\text{A}_x\text{O}_4 \qquad \text{[Formula 1]}$$

wherein M is Fe or Mn having an oxidation number of +2 to +3, A is an element having an oxidation number of +3 to +4 wherein A substituting for P is at least one element selected from the group consisting of Ti(4+), Al(3+), B(3+), Zr(4+), Sn(4+), Pb(4+) and Ge(4+), and 0<x<1, at least a fraction of M having a multi-valent oxidized state, resulting in an increase in conductivity compared to its single-valent oxidized state.

3. A lithium secondary battery using an electrode active material comprising a compound of the following formula 1 according to claim 1:

$$\text{LiMP}_{1-x}\text{A}_x\text{O}_4 \qquad \text{[Formula 1]}$$

wherein M is Fe or Mn having an oxidation number of +2 to +3, A is an element having an oxidation number of +3 to +4 wherein A substituting for P is at least one element selected from the group consisting of Ti(4+), Al(3+), B(3+), Zr(4+), Sn(4+), Pb(4+) and Ge(4+), and 0<x<1, at least a fraction of M having a multi-valent oxidized state, resulting in an increase in conductivity compared to its single-valent oxidized state.

4. A compound represented by the following formula 1:

$$\text{LiMP}_{1-x}\text{A}_x\text{O}_4 \qquad \text{[Formula 1]}$$

wherein M is Fe or Mn having an oxidation number of +2 to +3, A is an element having an oxidation number of +3 to +4, wherein A substituting for P is at least one element selected from the group consisting of Ti(4+), Al(3+), B(3+), Zr(4+), Sn(4+), V(4+), Pb(4+) and Ge(4+), and $0 < x \leq 0.02$, at least a fraction of M having a multi-valent oxidized state, resulting in an increase in conductivity compared to its single-valent oxidized state.

5. An electrode active material comprising a compound of formula 1 according to claim 4.

6. A lithium secondary battery using an electrode active material comprising a compound of formula 1 according to claim 4.

* * * * *